(12) United States Patent
Lee et al.

(10) Patent No.: US 10,824,314 B2
(45) Date of Patent: Nov. 3, 2020

(54) USER TERMINAL AND CONTROL METHOD OF THE SAME

(71) Applicant: SAMSUNG ELECTRONICS CO., LTD., Suwon-si, Gyeonggi-do (KR)

(72) Inventors: Seung Hun Lee, Suwon-si (KR); Do Youn Kang, Hwaseong-si (KR); Sung Bae Park, Bucheon-si (KR); Ju Yeon Lee, Yongin-si (KR); Jung Hwan Choi, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/069,597

(22) PCT Filed: Apr. 26, 2016

(86) PCT No.: PCT/KR2016/004323
§ 371 (c)(1),
(2) Date: Jul. 12, 2018

(87) PCT Pub. No.: WO2017/126744
PCT Pub. Date: Jul. 27, 2017

(65) Prior Publication Data
US 2019/0026012 A1 Jan. 24, 2019

(30) Foreign Application Priority Data
Jan. 22, 2016 (KR) .................. 10-2016-0008338

(51) Int. Cl.
*G06F 3/0484* (2013.01)
*G06F 3/0481* (2013.01)
(Continued)

(52) U.S. Cl.
CPC ........ *G06F 3/04845* (2013.01); *G06F 3/0481* (2013.01); *G06F 3/0486* (2013.01);
(Continued)

(58) Field of Classification Search
CPC ..................................................... G06F 3/048
See application file for complete search history.

(56) References Cited

U.S. PATENT DOCUMENTS

| 2009/0228820 | A1* | 9/2009 | Kim et al. | G06F 3/048 |
| 2013/0132885 | A1* | 5/2013 | Maynard et al. | G06F 3/048 |
| 2013/0275901 | A1* | 10/2013 | Saas et al. | G06F 3/0486 |

FOREIGN PATENT DOCUMENTS

| KR | 10-2015-0077774 | 7/2015 |
| WO | 2013-051762 | 4/2013 |
| WO | 2013/151322 | 10/2013 |

OTHER PUBLICATIONS

International Search Report for PCT/KR2016/004323, dated Oct. 18, 2016, 4 pages.
(Continued)

*Primary Examiner* — James J Debrow
(74) *Attorney, Agent, or Firm* — Nixon & Vanderhye, P.C.

(57) ABSTRACT

The present invention provides a user terminal and a control method of the same, in which a first object is easily changed into a second object by moving to an edge region on a screen. The user terminal includes: an image processor configured to process an image; a display configured to display the processed image; and a controller configured to control the image processor so that a first object included in the image can be moved to an edge region on a screen of the display in response to a user's input for moving the first object to the edge region on the screen of the display, and the first object can be changed into a second object smaller than the first object and displayed on the display.

13 Claims, 25 Drawing Sheets

(51) Int. Cl.
*H04M 1/725* (2006.01)
*G06F 3/0486* (2013.01)
*G06F 3/0488* (2013.01)
*G06F 3/0482* (2013.01)

(52) U.S. Cl.
CPC ........ *G06F 3/04883* (2013.01); *H04M 1/725* (2013.01); *H04M 1/72522* (2013.01); *H04M 1/72583* (2013.01); *G06F 3/0482* (2013.01); *G06F 2203/04808* (2013.01)

(56) References Cited

OTHER PUBLICATIONS

Written Opinion of the ISA for PCT/KR2016/004323, dated Oct. 18, 2016, 7 pages.

\* cited by examiner

USER TERMINAL AND CONTROL METHOD OF THE SAME

TECHNICAL FIELD

The present invention relates to a user terminal and a control method of the same, in which a first object of obstructing a view is easily changed into a second object by moving from a center region to an edge region on a screen.

BACKGROUND ART

Various applications (program icons, etc.) and the like are available through a user terminal, and a user uses the user terminal by executing a plurality of applications (program icons, etc.). When the plurality of applications (program icons, etc.) are executed, there is a need of moving an object of the executed applications (program icons, etc.), closing the executed applications (program icons, etc.), reducing the size of the object of the executed applications (program icons, etc.), or the like many inputs because of a restricted region on a screen.

FIGS. 1A, 1B, 1C illustrate that an object is moved from a center region on a screen in a user terminal 1 of the related art. To get an object A, which is positioned in a screen center region of the user terminal 1, out of the screen center region, a user has to first touch the object (FIG. 1A), and select one of buttons B displayed for adjusting size control. In this example, a user selects a minimization button for minimizing the object A (FIG. 1B), thereby getting the object A out of the screen center region (FIG. 1C). To view the application (program) of the object A again, there is a need of selecting the object or using another button to find and select the object A.

However, a view for an object of an application (program icon, etc.) needed now may be not secured since one object is temporally positioned in the center region on the screen. Besides, a user has wanted to more intuitively and easily get the object of the application (program icon, etc.) out of the center region on the screen so as to avoid obstructing an object of an application program desired to be displayed.

DISCLOSURE

Technical Problem

An aspect of the present invention is to provide a user terminal and a control method of the same, in which an object is easily moved to an edge region and reduced in size, thereby securing a center region on a screen to be free from obstruction of the object.

Technical Solution

A user terminal conceived to solve the problems of the present invention includes: an image processor configured to process an image; a display configured to display the processed image; and a controller configured to control the image processor so that a first object included in the image can be moved to an edge region on a screen of the display in response to a user's input for moving the first object to the edge region on the screen of the display, and the first object can be changed into a second object smaller than the first object and displayed on the display.

Here, the controller may determine a position for the second object based on at least one of an input direction, an input releasing position, and an input kind of the user.

Further, the controller may determine at least one among a size, shape, color, and transparency of the second object based on the position of the second object, a running state of the first object, and the edge region.

Here, the second object may comprise at least one among a shape, color and region of the first object, a region for release into the first object, and a mark for informing the release into the first object.

Further, the controller may change the second object into the first object in response to the user's input including at least one of an input direction, an input releasing position, and an input kind with regard to the second object.

Here, the controller may determine the position of the first object based on at least one among a direction, degree, and kind of the user's input and an input releasing position with regard to the second object.

Further, the controller may control a plurality of second objects to be displayed as overlapped.

Here, the controller may inform each overlapped second object in response to the user's input.

Further, the controller may set at least one among a size, shape, color, and transparency of the second object.

Here, the controller may change a plurality of first objects into a plurality of second objects in response to the user's input.

A method of controlling a user terminal conceived to solve the problems of the present invention includes: moving a first object included in an image to an edge region on a display screen in response to a user's input for moving the first object to the edge region on the display screen; changing the first object into a second object smaller than the first object; and displaying the second object.

Here, the moving may comprise determining a position for the second object based on at least one of an input direction, an input releasing position, and an input kind of the user.

Further, the determining of the position for the second object may comprise determining at least one among a size, shape, color, and transparency of the second object based on the position of the second object, a running state of the first object, and the edge region.

Here, the second object comprises at least one among a shape, color and region of the first object, a region for release into the first object, and a mark for informing the release into the first object.

Further, the method may additionally comprises: changing the second object into the first object in response to the user's input including at least one of an input direction, an input releasing position, and an input kind with regard to the second object.

Here, the changing into the first object may comprise determining the position of the first object based on at least one among a direction, degree, and kind of the user's input and an input releasing position with regard to the second object.

Further, the method may further comprise displaying a plurality of second objects as overlapped.

Here, the displaying as overlapped may comprise informing each overlapped second object in response to the user's input.

Further, the method may further comprise setting at least one among a size, shape, color, and transparency of the second object.

Here, the method may further comprise changing a plurality of first objects into a plurality of second objects in response to the user's input.

Advantageous Effects

According to the present invention, it is easy to move an object to an edge region and reduce the size of the object, thereby having an effect on securing a center region of a screen to be free from the obstruction of the object.

Further, the object moved to the edge region and reduced in size is easily returned to the center region of the screen.

BEST MODE

Hereinafter, embodiments of the present invention will be described to be easily materialized by a person having ordinary skill in the art, to which the present invention pertains, with reference to the accompanying drawings. The present invention may be achieved in various different forms, and not limited to the embodiments set forth herein.

FIGS. 2A, 2B, 2C, 2D illustrate that an image of teeth is captured and analysis information about the teeth is displayed on a screen in a user terminal 10 according to one embodiment of the present invention.

FIGS. 2A, 2B, 2C, 2D illustrate that an object is moved to an edge region and reduced in size in a user terminal 10 according to one embodiment of the present invention.

Figure 1A:
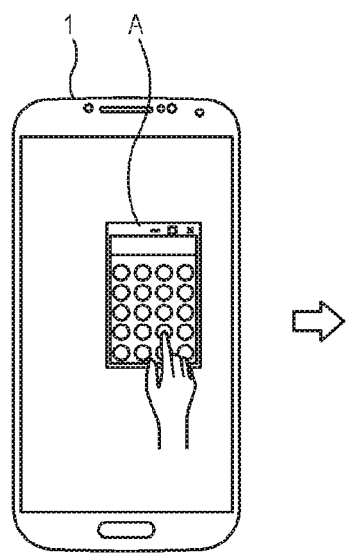
FIGS. 1A, 1B, 1C illustrate that an object is moved from a center region on a screen in a user terminal of a related art.
Figure 1B:
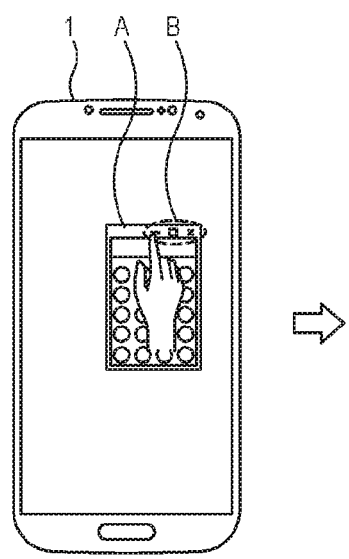
Figure 1C:
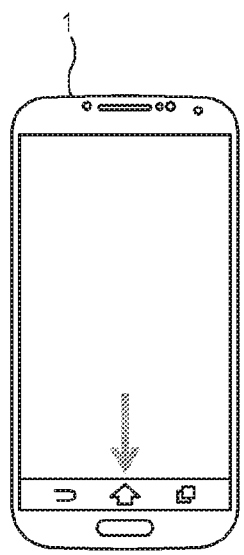
Figure 2A:
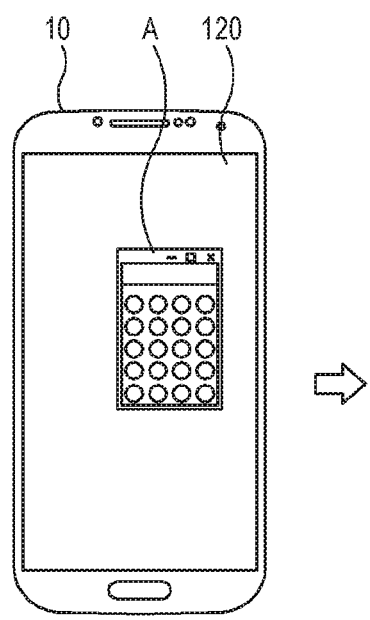
FIGS. 2A, 2B, 2C, 2D illustrate that an object is moved to an edge region and reduced in size in a user terminal according to one embodiment of the present invention.

In FIG. 2A, an object A is displayed in a center region on a screen of the user terminal 10.

Figure 2B:
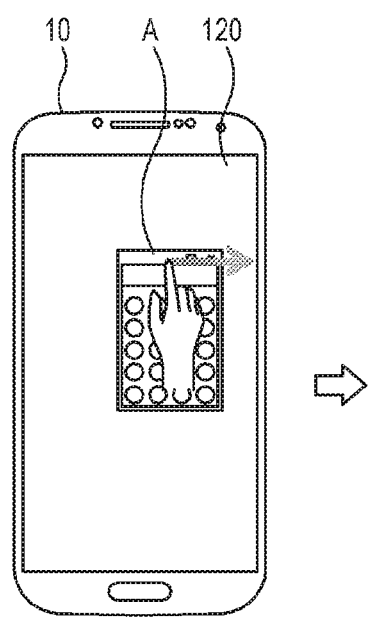

In FIG. 2B, a user touches and moves the object A, which is displayed in the center region on the screen of the user terminal 10, in a rightward direction. The object A may have a touch region for movement, and the touch region may have to be touched and moved to move the object. However, the touch region may be not present, and the object may be set to move in response to touch with any region unlike touch for execution.

Figure 2C:
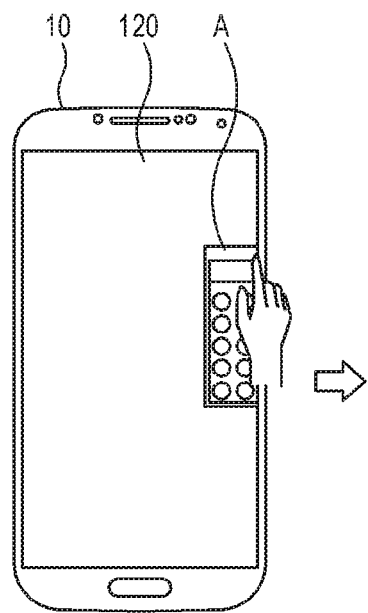

In FIG. 2C, at least a part of the object moved by a user's touch gets out of a screen region, or is moved within at least one setting among settings such as the size of the object, a preset distance from the edge region, etc.

Figure 2D:
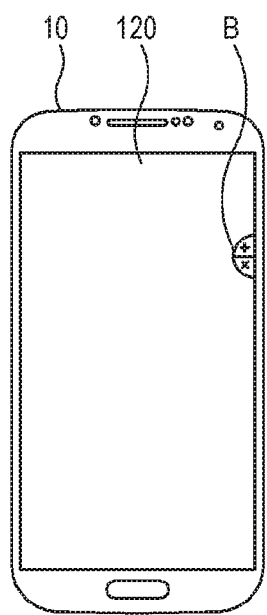

In FIG. 2D, when at least a part of the object moved by a user's touch gets out of the screen region or is moved within at least one setting among the settings such as the size of the object, a preset distance from the edge region, etc., the object A is changed into an object B smaller than the object A. Further, the position of the object may be determined based on at least one among a direction of a user's input, an input releasing position, and the kind of the input, and the object B may be positioned at the determined position. In FIG. 2D, the object B is positioned as a semicircular shape in an edge region of the screen, but there are no limits to the shape of the object B. Further, the object B may be displayed corresponding to the characteristic shape, color, logo and the like of the object A, thereby informing that it is changed from the object A. Further, the object B may display at least one of a selection region for release to return to the object A, and a mark for informing the release.

In FIGS. 2A, 2B, 2C, 2D, a user's input is achieved by touch, and drag-and-drop methods, but not limited thereto. Of course, a user's input may be achieved by a touch swing method of touching and swing an input, a plurality of touch inputs, etc.

Figure 3:
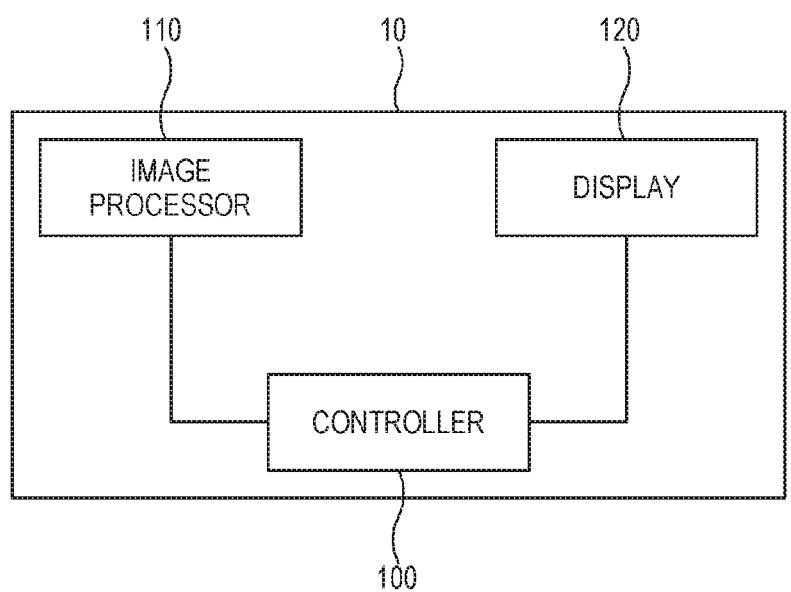
FIG. 3 is a block diagram of a user terminal according to the present invention.

FIG. 3 is a block diagram of a user terminal 10 according to the present invention. The user terminal 10 according to the present invention may include an image processor 110, a display 120, and a controller 100.

The image processor 110 performs image processing processes without limitations to the kinds thereof, and the image processing processes may for example include de-multiplexing for dividing a predetermined signal into signals corresponding to characteristics, decoding corresponding to an image format of an image signal, de-interlacing for converting an image signal from an interlaced type into a progressive type, noise reduction for improving image quality, detail enhancement, frame refresh rate conversion, etc. Further, the image processing processes may further include a decoder (not shown) for decoding a source image corresponding to an image format of an encoded source image, and a frame buffer (not shown) for storing the decoded source image in units of frames.

The image processor 110 may be achieved by a system-on-chip where various functions are integrated, or an image processing board (not shown) in which individual elements for independently performing respective processes are mounted a printed circuit board, and internally provided in the display apparatus.

The image processor 110 performs various preset image processing processes with regard to a broadcast signal including an image signal received from a receiver (not shown), and a source image including an image signal received from an image source (not shown). The image processor 110 outputs an image signal subjected to such a process to the display 120, so that the processed source image can be displayed on the display 120.

The display 120 may display an image based on an image signal output from an image processor 110. There are no limits to the types of the display 120. There may be various types of the display 110, such as liquid crystal, plasma, light-emitting diode, organic light-emitting diode, surface-conduction electron-emitter, carbon nano-tube, nano-crystal and the like types.

The display 120 may include additional elements in accordance with its types. For example, when the display 120 is of the liquid crystal type, the display 110 may include a liquid crystal display (LCD) panel (not shown), a backlight unit (not shown) for illuminating the LCD panel, and a panel driving board (not shown) for driving the LCD panel.

The display 120 displays an image based on an image signal processed by the image processor 110. There are no limits to a method of displaying an image on the display 120, and the method may include a LCD, a plasma display panel (PDP), an organic light emitting diode (OLED), and the like method. In this case, the display 120 may include an LCD panel, a PDP panel, an OLED panel, etc.

The display 120 may display an image and a color calibration process. The display 120 may include a display panel for displaying an image thereon, and a panel driver for processing an input image signal to be displayed as an image on the display panel. However, there are no limits to detailed materialization. An image signal received from an external input source through an interface is subjected to decoding, de-interlacing, scaling and the like image processing processes and then displayed on the display 120.

The controller 100 may control general elements inside the user terminal 10. The controller 100 may control the image processor 110 so that a first object included in an image can be moved to an edge region on a screen in response to a user's input for moving the first object to the edge region on the screen of the display 120, and displayed on the first display 120 as changed into a second object smaller than the first object.

Figure 4:
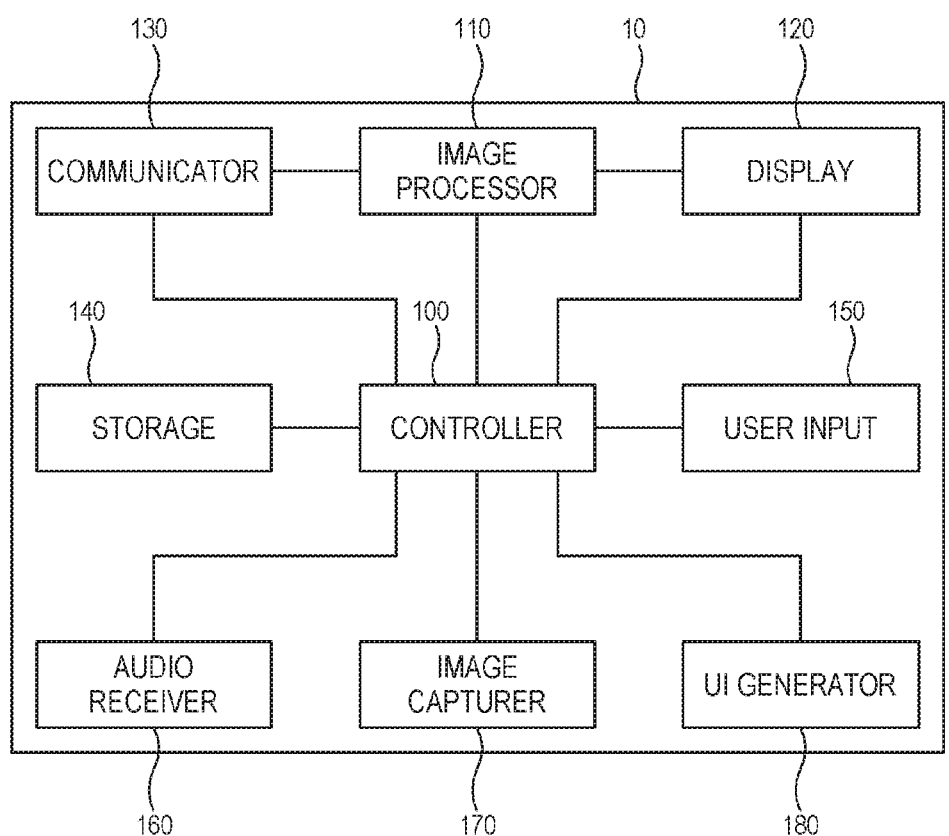
FIG. 4 is a block diagram of a user terminal according to one embodiment of the present invention

FIG. 4 is a block diagram of a user terminal 10 according to one embodiment of the present invention. According to one embodiment of the present invention, the user terminal 10 may include the elements of FIG. 3, and may additionally include a communicator 130, a storage 140, a user input 150, an audio receiver 160, an image capturer 170, and a UI generator 180.

The communicator 130 may receive a signal based on an external input and transmit the signal to the image processor 110 or the controller 100. The communicator 130 may connect with various external input cables to receive a signal from the external input by the cable, or may wirelessly receive a signal in accordance with preset wireless communication standards.

The communicator 130 may include a plurality of connectors (not shown) to which the cables are respectively connected. The communicator 130 may receive a signal from a connected external input, for example, a broadcast signal, an image signal, a data signal and the like based on high definition multimedia interface (HDMI), universal serial bus (USB), and Component standards, or may receive communication data through a communication network.

The communicator 130 may include not only an element for receiving a signal/data from an external input, but also various additional elements such as a wireless communication module (not shown) for wireless communication or a tuner (not shown) for a broadcast signal in accordance with designs of the user terminal 10. The communicator 130 may not only receive a signal from the external device but also transmit the information/data/signal of the user terminal 10 to the external device. That is, the communicator 130 is not limited to only the elements for receiving the signal from the external device, and may be achieved as an interface for interactive communication. The communicator 130 may receive a control signal for selecting a user interface (UI) from a plurality of control devices. The communicator 130 may be materialized by a communication module for publicly known wireless near field communication, such as Bluetooth, Infrared, Ultra-Wideband (UWB), ZigBee, etc., or may be materialized by a publicly known communication port for wired communication. The communicator 130 may be utilized for many purposes of transmitting/receiving data, a command for controlling the display, etc. as well as the control signal for selecting the UI.

The storage 140 may be materialized by a writable nonvolatile memory (i.e. read only memory (ROM)) in which data is retained even though the user terminal 10 is powered off and which can reflect a user's changes. That is, the storage 140 may be provided as one of a flash memory, an erasable programmable read only memory (EPROM) and an electrically erasable programmable read only memory (EEPROM).

The user input 150 may transmit various preset control commands or information to the controller 100 in response to a user's control and input. The user input 150 may be materialized by a menu-key or input panel provided at an outer side of the user terminal 10, or a remote controller or the like separated from the user terminal 10. Alternatively, the user input 150 and the display 120 may be integrated into a single body. When the display 120 is provided as a touch screen, a user may touch an input menu (not shown) displayed on the display 120, thereby transmitting a preset command to the controller 100.

The user input 150 may receive a user's motion and voice. The motion of a user may include a touch input. The user input 150 may receive a user's motion and voice directly, or may receive information about a user's motion and voice form the external device.

The audio receiver 160 is materialized by a microphone to receive a user's voice command and transmit it to the controller 100.

The image capturer 170 is materialized by a microphone to receive a user's gesture and transmit it to the controller 100.

The UI generator 180 may generate a UI for operating an application program to be executed. The UI includes a plurality of sub UIs provided in the form of an icon, a text, etc. When a user selects a certain sub UI through the user terminal 10, the application program may operate corresponding to the selected sub UI. That is, each sub UI may be generated in units of a plurality of functions or events for operating the application program running in the user terminal 10.

The UI generator 180 refers to a software or hardware function for generating and controlling a UI displayed on the display 120, and the function may be performed by the controller 100 to be described later. In other words, the UI generator 180 may be configured by a separate chipset, or may be configured by a separate microprocessor.

The controller 100 may determine a position of the second object based on at least one of an input direction, an input releasing position, and an input kind of a user.

The controller 100 may determine at least one among the size, shape, color, and transparency of the second object based on the position of the second object, the running state of the first object, and the edge region.

The second object may include at least one of the shape, color and region of the first object, a region for release into the first object, and a mark for informing the release into the first object.

The controller 100 may change the second object into the first object in response to a user's input including at least one among the input direction, the input releasing position, and the input kind with regard to the second object.

The controller 100 may determine the position of the first object based on at least one among the user's input direction, degree, kind, and input releasing position with regard to the second object.

The controller 100 may display the plurality of second objects as overlapped.

The controller 100 may inform a user of the overlapped second objects through a UI in response to an input.

The controller 100 may set at least one among the size, shape, color, and transparency of the second object.

The controller 100 may change a plurality of first objects into a plurality of second objects in response to a user's input.

Figure 5:
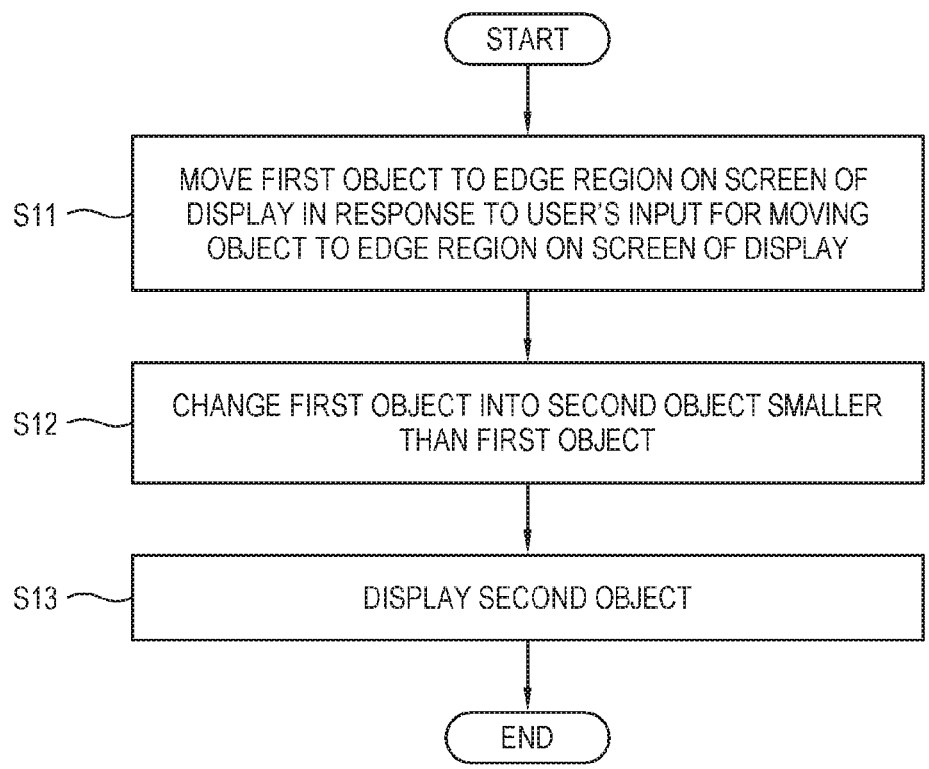
FIG. 5 is a control flowchart of showing a control method of a user terminal according to the present invention.

FIG. 5 is a control flowchart of showing a control method of the user terminal 10 according to the present invention.

The first object included in the image is moved to the edge region on the screen of the display in response to a user's input for moving the first object to the edge region on the screen of the display (S11).

The first object is changed into the second object smaller than the first object (S12).

The changed second object is displayed (S13).

Figure 6:
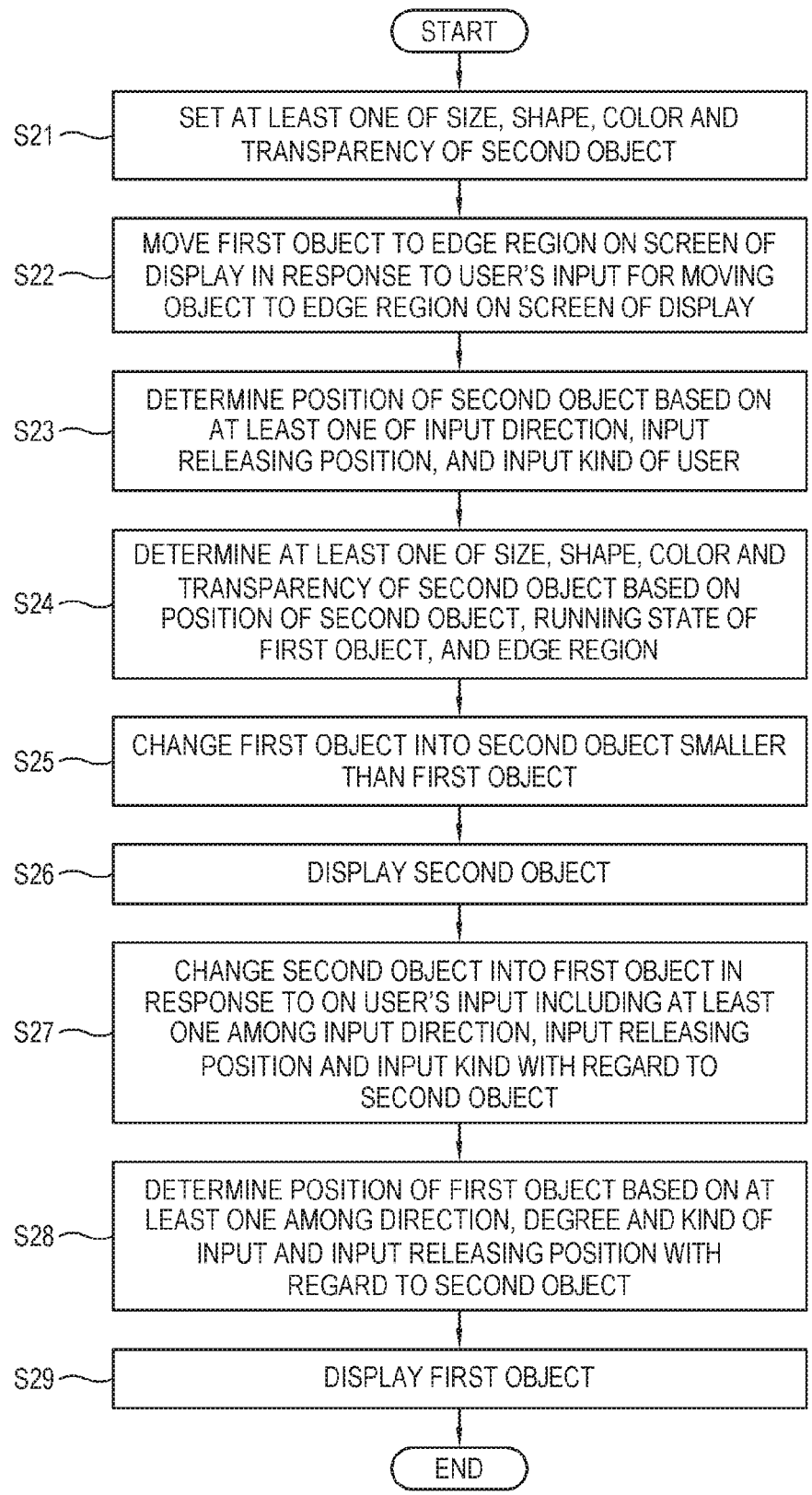
FIG. 6 is a control flowchart of showing a control method of a user terminal according to one embodiment of the present invention.

FIG. 6 is a control flowchart of showing a control method of the user terminal 10 according to one embodiment of the present invention.

At least one among the size, shape, color, and transparency of the second object is set (S21).

The first object is moved to the edge region on the screen of the display 120 in response to a user's input for moving the first object to the edge region on the screen of the display 120 (S22).

The position of the second object is determined based on at least one among an input direction, an input releasing position, and an input kind of a user (S23).

At least one among the size, shape, color, and transparency of the second object is determined based on the position of the second object, the running state of the first object, and the edge region (S24).

The first object is changed into the second object smaller than the first object (S25).

The changed second object is displayed (S26).

The second object is changed into the first object in response to a user's input including at least one among the input direction, the input releasing position and the input kind of the second object (S27).

The position of the first object is determined based on at least one among the direction, degree, kind and input releasing position of a user's input with regard to the second object (S28). Here, the order of the operations S27 and S28 may be reversed.

The changed first object is displayed (S29).

Figure 7:
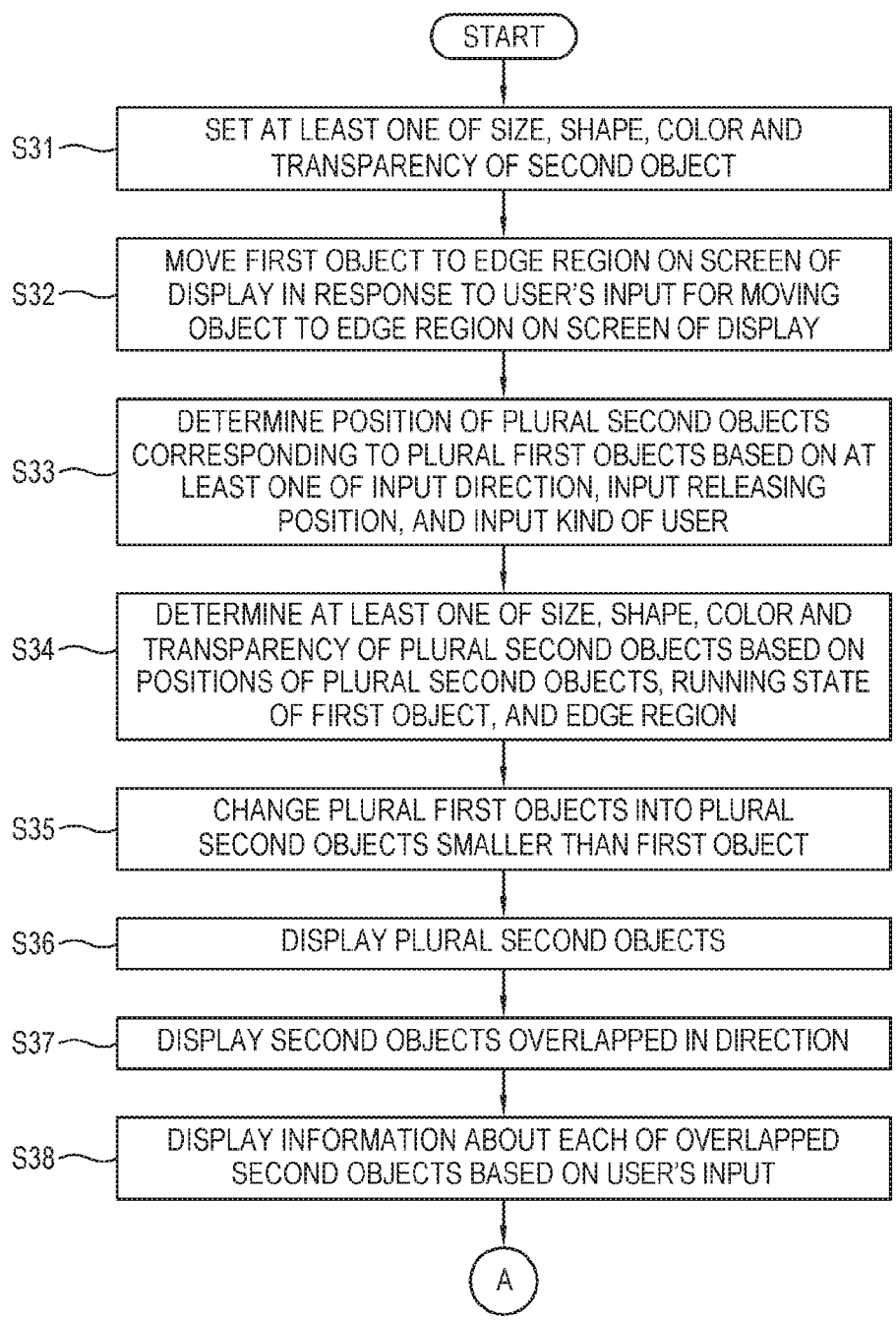
FIGS. 7 and 8 are control flowcharts of showing a control method of a user terminal according to another embodiment of the present invention.
Figure 8:
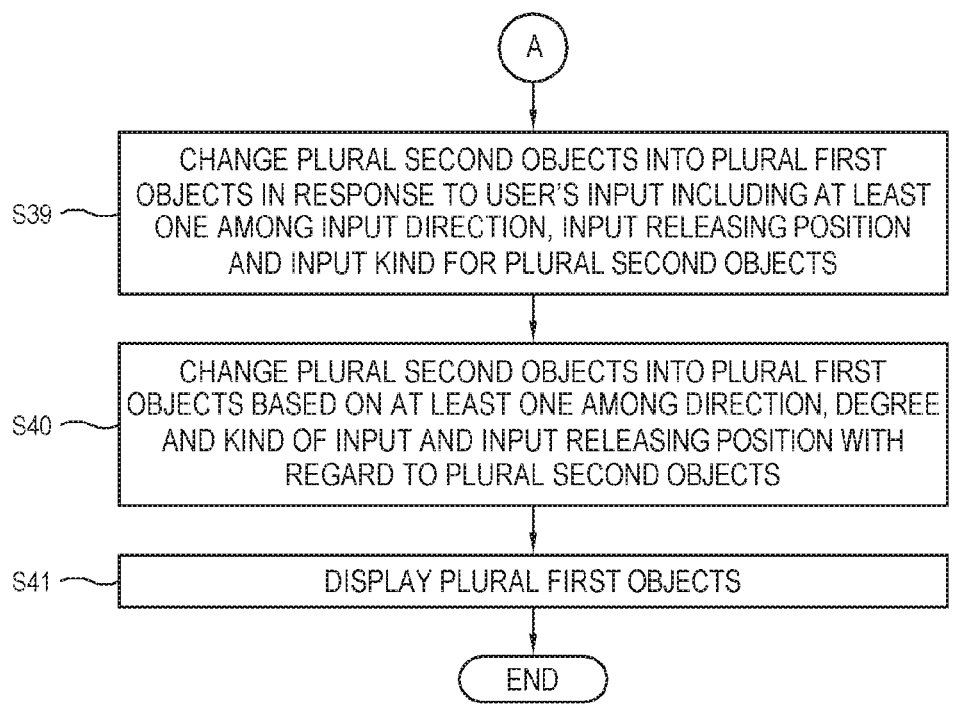

FIGS. 7 and 8 are control flowcharts of showing a control method of the user terminal 10 according to another embodiment of the present invention.

At least one among the size, shape, color, and transparency of the second object is set (S31).

The first object is moved to the edge region on the screen of the display 120 in response to a user's input for moving the first object to the edge region on the screen of the display 120 (S32).

The position of the second object is determined based on at least one among an input direction, an input releasing position, and an input kind of a user (S33).

At least one among the size, shape, color, and transparency of the second object is determined based on the position of the second object, the running state of the first object, and the edge region (S34).

The first object is changed into the second object smaller than the first object (S35).

The changed second object is displayed (S36).

The plurality of second objects overlapped with respect to a direction are displayed as overlapped (S37).

Information for informing each of the overlapped second objects is displayed in response to a user's input (S38).

The plurality of second objects is changed into the plurality of first objects in response to a user's input including at least one among the input direction, the input releasing position, and the input kind with respect to the plurality of second objects (S39).

The positions of the plurality of first objects are determined corresponding to the plurality of second objects based on at least one among the input direction, degree, kind of a user and the input releasing position with respect to the plurality of second objects (S40). Here, the order of the operations S27 and S28 may be reversed.

The plurality of changed first objects are displayed (S41).

Figure 9A:
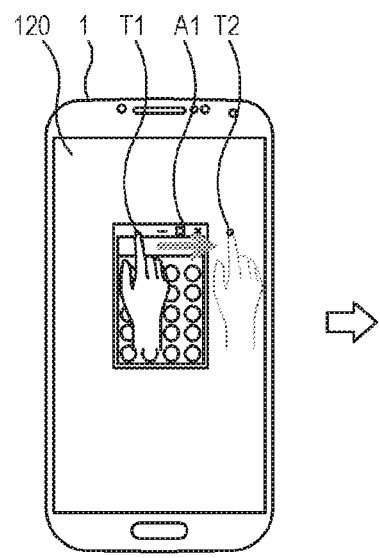
FIGS. 9A, 9B, 9C illustrate that an object is moved to an edge region and reduced in size by a user's touch swing input in a user terminal according to one embodiment of the present invention.
Figure 9B:
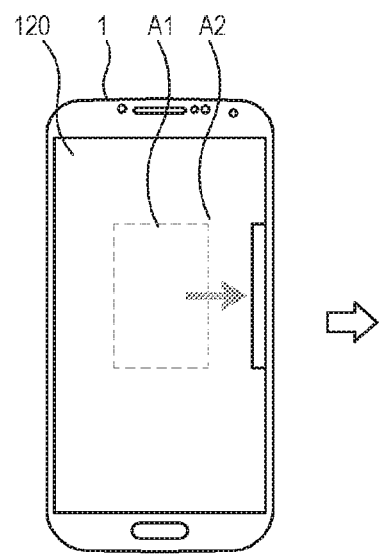
Figure 9C:
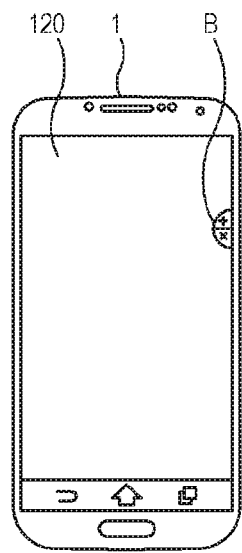

FIGS. 9A, 9B, 9C illustrate that an object is moved to an edge region and reduced in size by a user's touch swing input in the user terminal 10 according to one embodiment of the present invention.

In FIG. 9A, a user touches a point T1 on the first object displayed on the display 120, drags the first object to a point T2 as it is thrown rightward like a swing, and releases the touch at the point T2, In FIG. 9B, the first object continues to slide and move rightward in response to such a user's input even after the user's touch is released. Then, a region A1 is free from obstruction of the first object positioned 1 corresponding to a center region on the screen, and the first object is positioned in a region A2. A partial right side of the first object may get out of the region of the screen and disappear.

In FIG. 9C, the controller 100 may change the first object into the second object B when the first object is positioned within a predetermined distance from the right side of the screen, at least a part of the first object gets out of the screen, and the whole of the first object gets out of the screen. The second object B may be displayed as a semicircular shape, in which a mark for displaying the whole shape (□) as a full screen may be displayed at an upper portion of the displayed second object B, and a mark for displaying the minimum shape ( ) as a minimum screen may be displayed at a lower portion. This shape of the second object B is merely an example, and the second object B may have various different shapes.

Figure 10A:
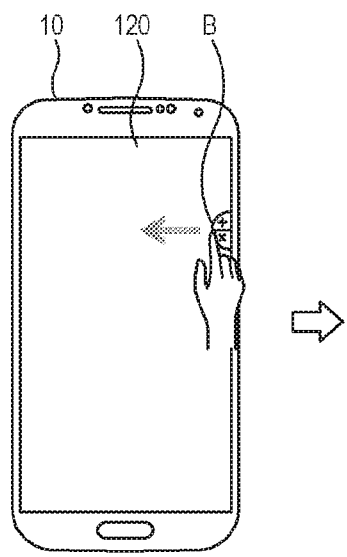
FIGS. 10A, 10B, 10C illustrate that an object moved and reduced in size is returned to a center region on a screen in a user terminal according to one embodiment of the present invention.
Figure 10B:
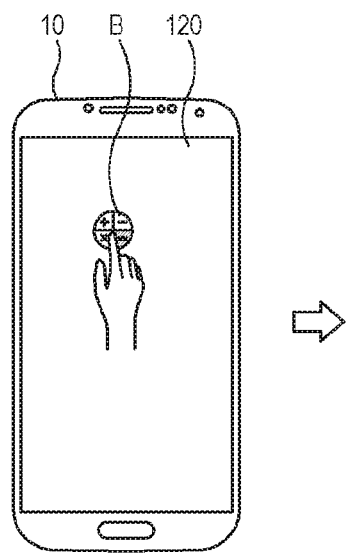
Figure 10C:
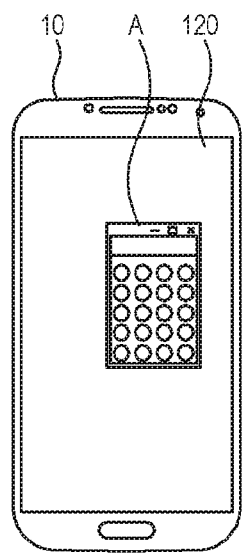

FIGS. 10A, 10B, 10C illustrate that an object moved and reduced in size is returned to a center region on a screen in the user terminal 10 according to one embodiment of the present invention.

In FIG. 10A, a user may touch the second object B positioned in the edge region on the screen of the display 120, and drag it leftward as shown therein.

In FIG. 10B, thus, the second object B is moved leftward and stopped at a position desired by a user.

In FIG. 10C, a user touches a mark region about the display shape and size displayed on the second object B and changes the second object B into the first object A.

A user's input for returning the second object B to the first object A may be varied depending on settings. To change the second object B to have the previous size of the first object A at the original position, the second object B may be touched, or may be dragged by a user to be changed in position. Further, the second object B may be moved to a center region on the screen and changed into the first object A in accordance with a degree of touch swing. Further, the second object B may be moved to and positioned in an opposite edge region in accordance with a user's touch swing. While the second object B is moving, the second object B may be changed into the first object A or may be just moved without the change.

Figure 11:
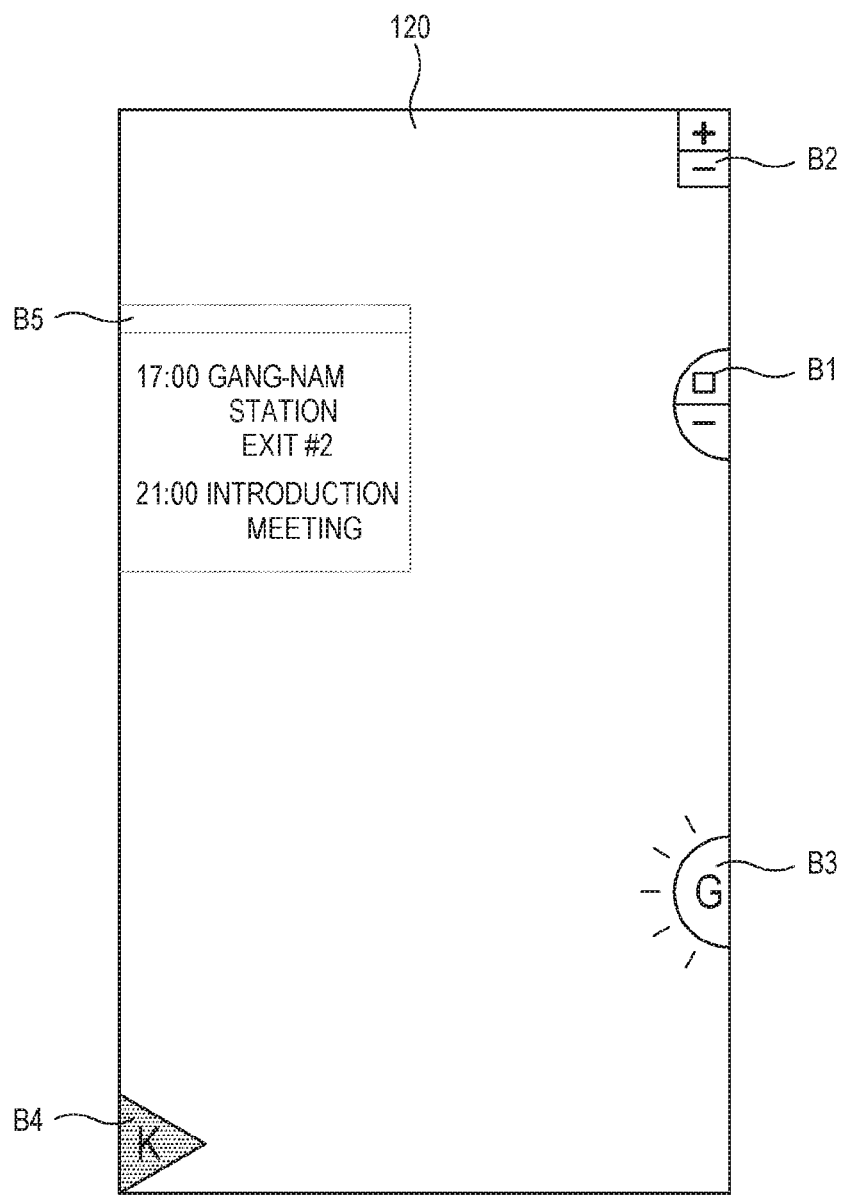
FIG. 11 illustrates the size, shape, color, transparency, etc. of an object moved and reduced in size in a user terminal according to one embodiment of the present invention.

FIG. 11 illustrates the size, shape, color, transparency, etc. of an object moved and reduced in size in the user terminal 10 according to one embodiment of the present invention.

The second object moved from the center region to the edge region on the screen of the user terminal 10 and reduced in size may be displayed with various sizes, shapes, color, transparency, etc.

A second object B1 is shaped like a semicircle and may include marks for displaying a full screen/minimized screen. The size of the second object B1 may be previously set in accordance with a user's settings, or may be varied. In FIG. 11, the second object B1 is positioned in the edge region, that is, in close-contact with the right side of the screen. Alternatively, the second object B1 may be a little spaced apart from the right side of the screen without the close contact. The color of the second object B1 may be set corresponding to the color of the first object of before the change.

Unlike the second object B1, a second object B2 is shaped like a rectangular shape and may include marks for enlargement/reduction. Thus, the second object B2 may be changed in size. In accordance with a user's tastes, the second object B2 may be set as a rectangular object, or may be changed in shape according to its positions.

A second object B3 is shaped like a semicircle, and may display a logo image of the first object of before change. Further, the second object B3 may be highlighted to be distinguished from other objects. The second object B3 highlighted to be distinguished from other second objects may include a broadcast image being broadcasted unlike a stored image of which reproduction is controllable, or a messenger of informing that a message arrives.

A second object B4 may be a triangular object.

A second object B5 may be positioned in an edge region on the screen but maintain the shape of the first object unlike other second objects. The second object B5 may be provided to display content, and set to have transparency so as to less obstruct a view for other first objects. For instance, when a first object is of a schedule chart, brief content may be maintained and provide information to a user.

Figure 12:
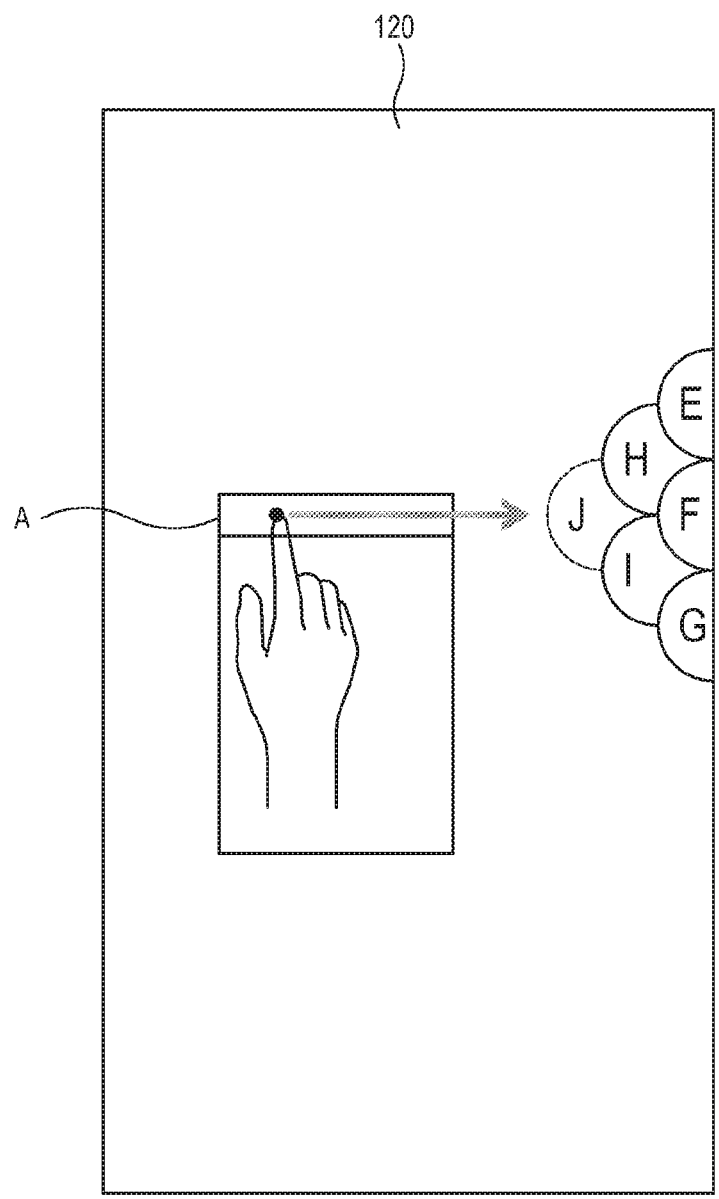
FIG. 12 illustrates that objects are displayed as overlapped in a user terminal according to one embodiment of the present invention.

FIG. 12 illustrates that objects are displayed as overlapped in the user terminal 10 according to one embodiment of the present invention.

As the first objects are moved and changed, the second objects may pile up in the edge region on the screen. In this case, a user may move the plurality of first objects in similar directions and change them into the second objects. When a user's input is made in a direction toward the second object, the controller 100 may position the moved second objects at opposite sides of the already positioned second object. Further, as shown in FIG. 12, the second objects E, F, G, H, I and J may be displayed as overlapped in accordance with settings. For example, when a user moves one first object rightward and changes it into a second object, it is expected that a desired second object is present in the moving direction. However, when a user continues to move the first object in a similar direction without overlap, the second object may be positioned along a right edge region of the screen in a direction different from the moving direction. In this case, a user may be a little configured, and therefore the second objects may be overlapped and grouped. Of course, the second objects are overlapped enough as long as a center region of the screen is not obstructed.

Figure 13:
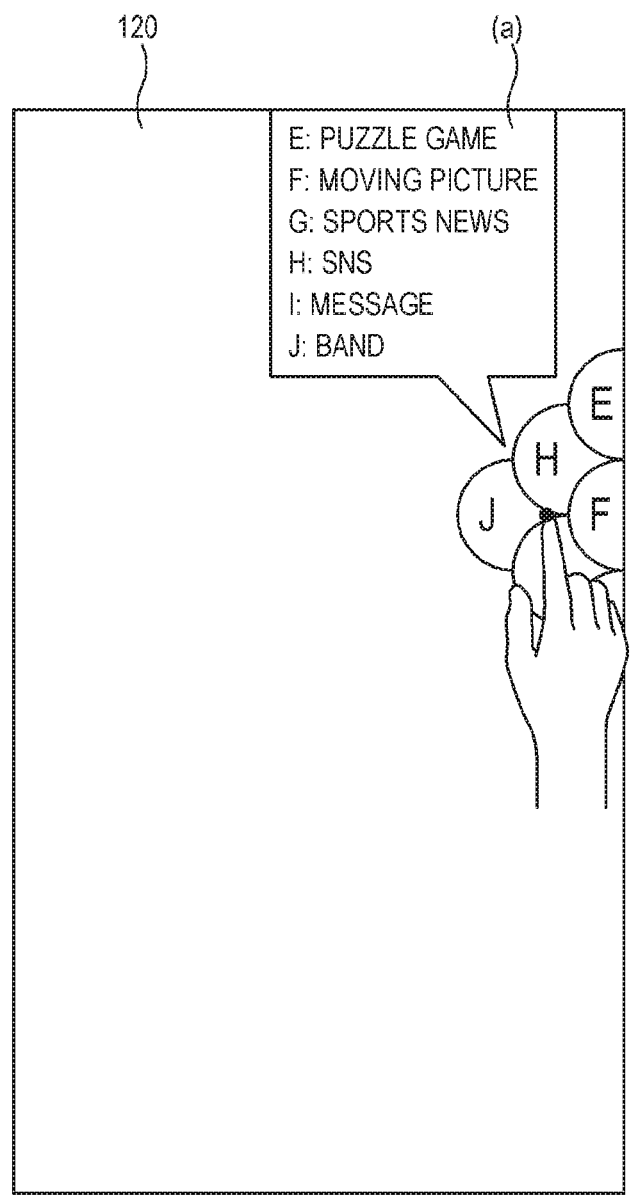
FIG. 13 illustrates descriptions about each of overlapped objects in a user terminal according to one embodiment of the present invention.

FIG. 13 illustrates descriptions about each of overlapped objects in the user terminal 10 according to one embodiment of the present invention.

When the second objects are overlapped as described in FIG. 12, it may be difficult to know what application program corresponds to the object among the overlapped second objects. Therefore, when a user touches a group of second objects or when a user is within a predetermined distance from the screen of the display 120 to make touch, it may be guided what application program corresponds to each second object. The guide may be made with regard to every second object through a UI, or only the second object selected by a user. As shown in FIG. 13, a guide UI (a) may be displayed with regard to the overlapped second objects E, F, G, H, I and J.

Figure 14:
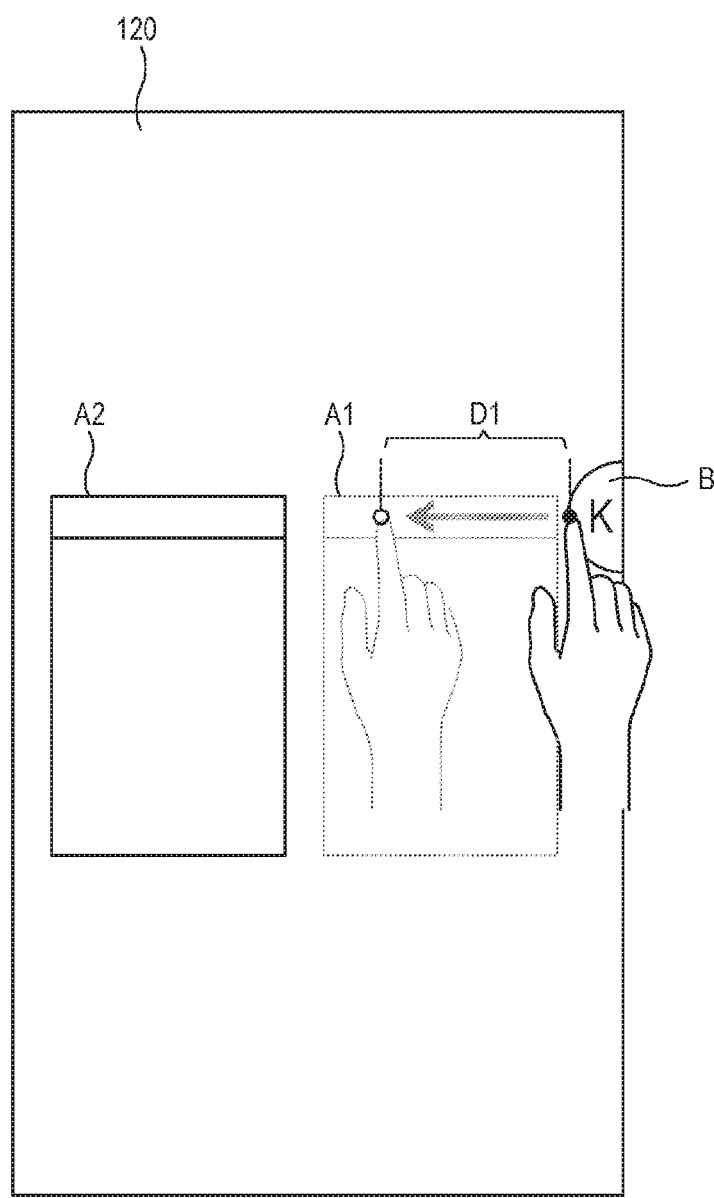
FIG. 14 illustrates that an object moved to an edge region and reduced in size is returned to a center region on a screen by a user's touch swing input in a user terminal according to one embodiment of the present invention.

FIG. 14 illustrates that an object moved to an edge region and reduced in size is returned to a center region on a screen by a user's touch swing input in the user terminal 10 according to one embodiment of the present invention.

A user touches a second object B reduced in size as moved from a center region to an edge region on a screen of the user terminal 10, and releases the touch after dragging leftward as much as a distance D1. In response to a user's input, the second object is changed into the first object and then displayed on the screen. Further, the first object may be moved and displayed in one of regions A1 to A2 in accordance with a user's speeds of dragging leftward as much as the distance D1. The higher the user's dragging speed is, the more the first object moves leftward. The lower the user's dragging speed is, the less the first object moves leftward.

Figure 15A:
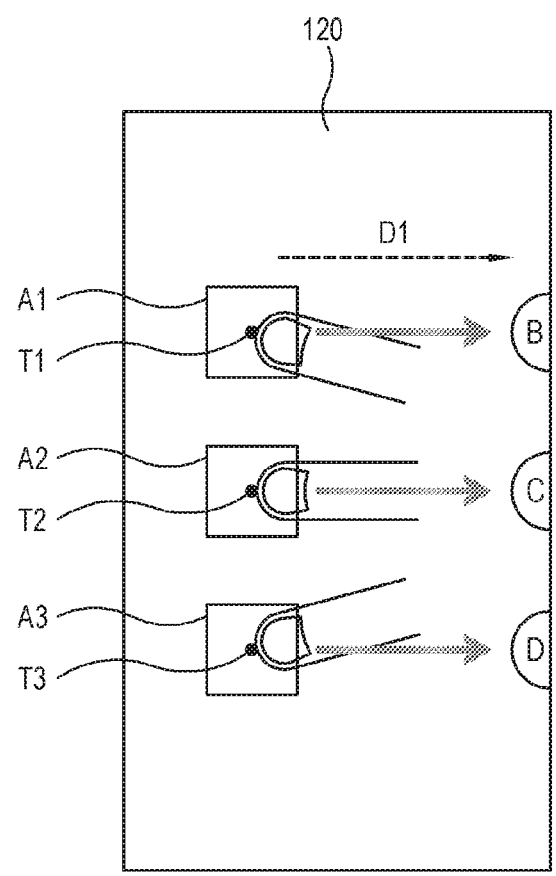
FIGS. 15A, 15B illustrate that a plurality of objects are moved to an edge region and reduced in size and returned in a user terminal according to one embodiment of the present invention.
Figure 15B:
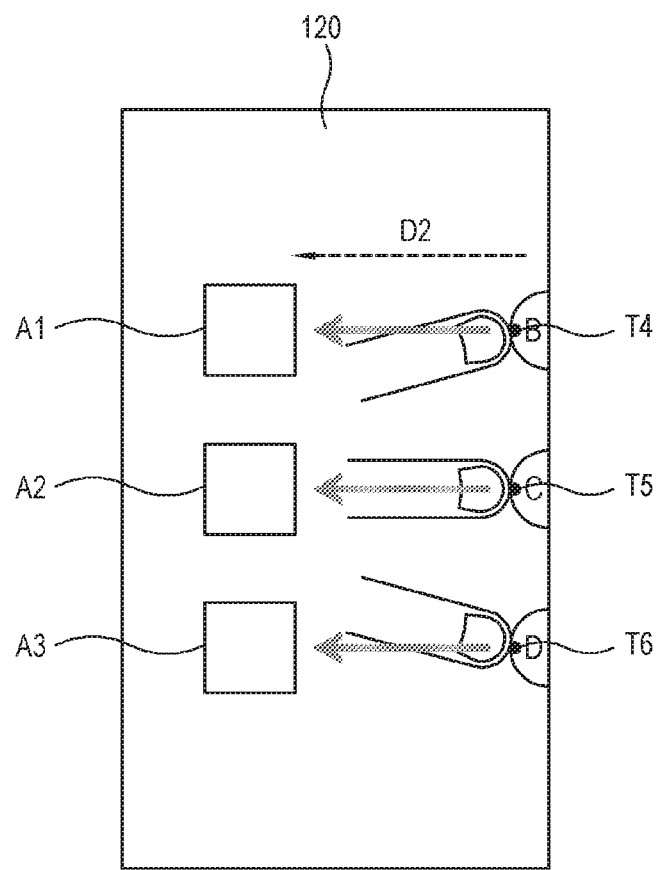

FIGS. 15A, 15B illustrate that a plurality of objects are moved to an edge region and reduced in size and returned in a user terminal according to one embodiment of the present invention.

A user makes touches T1, T2 and T3 with a plurality of first objects A1, A2 and A3 using three fingers and then releases the touches while dragging and swinging them in a direction D1. In this regard, the plurality of first objects A1, A2 and A3 are moved to the edge region in the direction D1 and changed into the second object. Like this, the plurality of first objects are moved at a time and changed into respective first objects. On the other hand, a user makes touches T4, T5 and T6 with the plurality of second objects B, C and D using three fingers so as to release/change the second object into the first object, and then releases the touches while dragging and swinging them in a direction D2. Thus, the second object B, C and D are respectively changed into the plurality of first objects A1, A2 and A3 and displayed on the screen center region.

With the user terminal 10, a user can move the first object, which may obstruct a view for a center region on the screen of the display 120, to an edge region on the screen, thereby intuitively and easily using the user terminal 10.

Although a few embodiments of the present invention have been illustrated and described, various changes can be made from these embodiments by a person having an ordinary skilled in the art to which the present invention pertains, without departing from the principle and spirit of the present invention. Therefore, the scope of the invention has to be defined in the appended claims and their equivalents without limitations to the described exemplary embodiments.

The invention claimed is:

1. A user terminal comprising:
an image processor configured to process an image;
a display configured to display the processed image; and
a controller configured to:
based on executing a plurality of applications, control the display to display a plurality of first objects indicating the executed plurality of applications,
based on a first user's input for moving the plurality of first objects to an edge region on a screen of the display, control the display to display the plurality of first objects to be moved to the edge region on the screen of the display,
change the plurality of first objects into a plurality of second objects smaller than the plurality of first objects,
control the display to display the changed plurality of second objects to be overlapped according to an input direction of the first user's input, and
based on a second user's input for selecting the plurality of second objects, control the display to display information on the executed plurality of applications.

2. The user terminal according to claim 1, wherein the controller is configured to determine a position for the plurality of second objects based on at least one of the input direction, an input releasing position, or an input kind of the first user's input.

3. The user terminal according to claim 2, wherein the controller is configured to determine at least one among a size, shape, color, and transparency of the plurality of second objects based on the position of the plurality of second objects, a running state of the plurality of first objects, and the edge region.

4. The user terminal according to claim 1, wherein the plurality of second objects comprises at least one among a shape, color and region of the plurality of first objects, a region for release into the plurality of first objects, and a mark for informing the release into the plurality of first objects.

5. The user terminal according to claim 1, wherein the controller is configured to change the plurality of second objects into the plurality of first objects in response to a third user's input including at least one of an input direction, an input releasing position, or an input kind with regard to the plurality of second objects.

6. The user terminal according to claim 5, wherein the controller is configured to determine the position of the plurality of first objects based on at least one among a direction, degree, and kind of the third user's input and an input releasing position with regard to the plurality of second objects.

7. The user terminal according to claim 1, wherein the controller is configured to inform each of the overlapped plurality of second objects in response to the second user's input.

8. The user terminal according to claim 1, wherein the controller is configured to set at least one among a size, shape, color, and transparency of the plurality of second objects.

9. A method of controlling a user terminal, the method comprising:
based on executing plurality of applications, displaying a plurality of first objects indicating the executed plurality of applications;
based on a first user's input for moving the plurality of first objects to an edge region on a screen of a display, moving the plurality of first objects to the edge region on the screen of the display;
changing the plurality of first objects into a plurality of second objects smaller than the plurality of first objects;
displaying the changed plurality of second objects to be overlapped according to an input direction of the first user's input; and
based on a second user's input for selecting the plurality of second objects, displaying information on the executed plurality of applications.

10. The method according to claim 9, wherein the moving comprises determining a position for the plurality of second objects based on at least one of the input direction, an input releasing position, or an input kind of the first user's input.

11. The method according to claim 10, wherein the determining of the position for the plurality of second objects comprises determining at least one among a size, shape, color, and transparency of the plurality of second objects based on the position of the plurality of second objects, a running state of the plurality of first objects, and the edge region.

12. The method according to claim 9, wherein the plurality of second objects comprises at least one among a shape, color and region of the plurality of first objects, a region for release into the plurality of first objects, and a mark for informing the release into the plurality of first objects.

13. The method according to claim 9, further comprising:
changing the plurality of second objects into the plurality of first objects in response to a third user's input including at least one of an input direction, an input releasing position, or an input kind with regard to the plurality of second objects.

* * * * *